(12) United States Patent
Fujiwara et al.

(10) Patent No.: US 8,145,038 B2
(45) Date of Patent: Mar. 27, 2012

(54) INFORMATION TRANSMITTING APPARATUS

(75) Inventors: Yoshinobu Fujiwara, Ome (JP); Mitsuaki Moritani, Musashino (JP); Kunio Honsawa, Ome (JP); Atsushi Nakajima, Higashimurayama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/953,032

(22) Filed: Nov. 23, 2010

(65) Prior Publication Data

US 2011/0123176 A1 May 26, 2011

(30) Foreign Application Priority Data

Nov. 24, 2009 (JP) ................. 2009-266615

(51) Int. Cl.
*H04N 9/80* (2006.01)
(52) U.S. Cl. ........................................ 386/252
(58) Field of Classification Search .......... None
See application file for complete search history.

(56) References Cited

U.S. PATENT DOCUMENTS

| 5,796,828 A * | 8/1998 | Tsukamoto et al. ........ 380/203 |
| 2003/0077074 A1 | 4/2003 | Okamoto et al. |
| 2004/0028228 A1 | 2/2004 | Ichiro et al. |
| 2006/0212910 A1 * | 9/2006 | Endres et al. .................. 725/73 |
| 2008/0031591 A1 | 2/2008 | Okamoto et al. |

FOREIGN PATENT DOCUMENTS

| JP | 08-030451 | | 2/1996 |
| JP | 2002-251819 | A | 9/2002 |
| JP | 2003-016725 | A | 1/2003 |
| JP | 2004-005939 | | 1/2004 |
| JP | 2006-166249 | A | 6/2006 |
| JP | 2006-185473 | A | 7/2006 |
| JP | 2007-072612 | A | 3/2007 |
| JP | 2007-140960 | A | 6/2007 |

OTHER PUBLICATIONS

Notice of Reasons for Rejection mailed by Japan Patent Office on Feb. 22, 2011 in the corresponding Japanese patent application No. 2009-266615.
Information Sheet in 1 page.

* cited by examiner

Primary Examiner — William C Vaughn, Jr.
Assistant Examiner — Tat Chio
(74) Attorney, Agent, or Firm — Knobbe, Martens, Olson & Bear, LLP (57) ABSTRACT

According to one embodiment, an information transmitting apparatus includes a receiver, a management module, a transmitter, and an update module. The receiver is configured to receive a first content item in which a first viewable time is set. The management module is configured to manage the first content item and a remaining viewable time. The transmitter is configured to transmit a second content item and information of second viewable time to a device to which a duplicate is to be made, the second content item being a duplicate of the first content item and the information of the second viewable time defining a period of time during which the second content item can be viewed in the device. The update module is configured to update the remaining viewable time managed by the management module to a period of time obtained by subtracting the second viewable time.

7 Claims, 5 Drawing Sheets

| Content ID | Copy control information | Viewing situation | Remaining viewable time |
|---|---|---|---|
| 1 | NMC | — | — |
| 2 | EPN | Viewing started | 8 hours |
| 3 | EPN | Viewing not started | 24 hours |
| 4 | CF | — | — |

FIG. 4

| | |
|---|---|
| Header | Packet type |
| | Header size |
| | Encryption mode |
| | Common secret information label |
| | Time-varying constant |
| | Content viewing situation |
| | Viewable time |
| | Data size |
| Payload | Encrypted data |

| Content ID | Copy control information | Viewing situation | Remaining viewable time |
|---|---|---|---|
| 1 | NMC | — | — |
| 2 | EPN | Viewing started | 8 hours |
| 3 | EPN | Viewing not started | 20 hours |
| 4 | CF | — | — |

INFORMATION TRANSMITTING APPARATUS

CROSS-REFERENCE TO RELATED APPLICATIONS

This application is based upon and claims the benefit of priority from Japanese Patent Application No. 2009-266615, filed Nov. 24, 2009, the entire contents of which are incorporated herein by reference.

BACKGROUND

1. Field

Embodiments described herein relate generally to a transmission technique of copying digital data between devices.

2. Related Art

As publicly known, the way in which audiovisual (AV) contents formed of digital data are used has recently changed, as computer networks, such as broadband and local area networks (LANs), become prevalent. A user can enjoy contents on a rental model, in which a content that the user has rented for a certain period of time via a network has to be returned or cannot be used after the certain period of time has elapsed, as well as on a model that permanently owns contents that the user has purchased via a network. Contents in a rental model are restricted in terms of the time during which the contents can be viewed after viewing is started.

The contents have an advantage of being easily copied without being deteriorated. On the other hand, the contents must be treated with care with respect to their copyrights. That is, the management method is important when the contents are handled on a rental model.

Jpn. Pat. Appln. KOKAI Publication No. 2004-5939 discloses a playback device configured to play back a content based on information on permitted playback time included in copyright information until the remaining time becomes zero, and does not play back when the remaining time becomes zero.

BRIEF DESCRIPTION OF THE DRAWINGS

A general architecture that implements various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an information transmitting apparatus includes a receiver, a management module, a transmitter, and an update module. The receiver is configured to receive a first content item in which a first viewable time is set, the first viewable time defining a period of time during which the content item can be viewed after being started to play back. The management module is configured to manage the first content item and a remaining viewable time by associating the first content item with the remaining viewable time, the remaining viewable time being a remaining period of time during which the first content item can be viewed. The transmitter is configured to transmit a second content item and information of second viewable time to a device to which a duplicate is to be made, the second content item being a duplicate of the first content item and the information of the second viewable time defining a period of time during which the second content item can be viewed in the device to which the duplicate is to be made. The update module is configured to update the remaining viewable time managed by the management module to a period of time obtained by subtracting the second viewable time.

Figure 1:
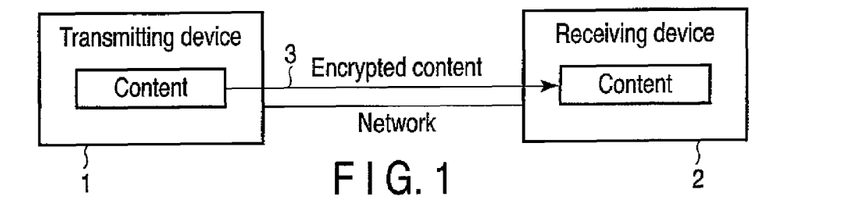
FIG. 1 is an exemplary block diagram schematically illustrating a transmitting device and a receiving device according to an embodiment.

Hereinafter, the embodiment will be described in detail with reference to the accompanying drawings. FIG. 1 is a block diagram schematically illustrating a transmission/reception system includes an information transmitting device 1 (information transmitting apparatus) and a receiving device connected via a network.

The embodiment is configured such that an encrypted audio or image content managed by the transmitting device 1 is copied (duplicated) to a receiving device 2 connected via a LAN 3, and the same content is managed by both of the transmitting device 1 and the receiving device 2.

The embodiment is targeted at contents that are protected by a copyright protection technique and restricted in terms of viewable time after viewing is started. Hereinafter, the "viewable time" will refer to the time during which contents can be viewed since viewing is started for the first time. The transmitting device 1 transmits a content that in which the viewable time is restricted with respect to the receiving device 2 connected via the LAN 3, while maintaining the viewable time. Maintenance of the viewable time will be described in detail below.

Contents that are protected by the copyright protection technique need to be encrypted by a transmission path protection technology and transferred between the transmitting device 1 and the receiving device 2. In the embodiment, a transmission path technology, such as Digital Transmission Content Protection over Internet Protocol (DTCP-IP), for example, is assumed.

Figure 2:
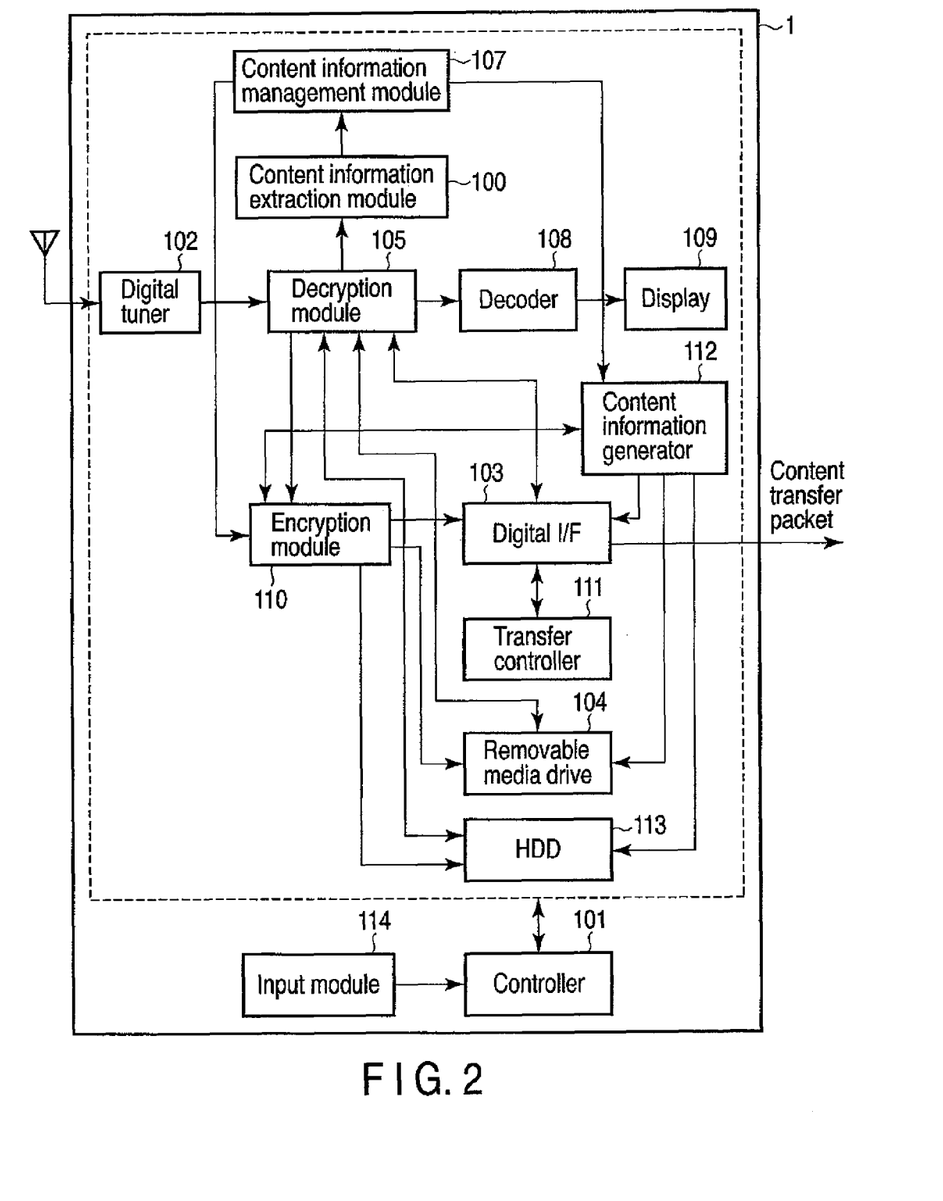
FIG. 2 is an exemplary block diagram schematically illustrating a transmitting device according to the embodiment.

Next, the configuration of the transmitting device 1 according to the embodiment will be described. FIG. 2 is a block diagram schematically illustrating the transmitting device 1. The transmitting device 1 is a television reception apparatus, a personal computer, or the like.

The transmitting device 1 includes a controller 101, a digital tuner 102, a digital interface (I/F) 103, a removable media drive 104, a decryption module 105, a content information extraction module 106, a content information management module 107, a decoder 108, a display 109, an encryption module 110, a transmission controller 111, a content information generator 112, a hard disk drive (HDD) 113, and an input module 114.

The controller 101 controls each of the modules of the transmitting device 1. The digital tuner 102 selects a channel for a broadcast signal to be received by an antenna for digital broadcast reception. The digital tuner 102 is protected by a copyright protection technique, for example, and functions as a content receiver. Similarly, the I/F 103, to which contents are input via a network, such as the Internet, and the removable media drive 104, which reads contents stored in various kinds of removable media, such as Digital Versatile Discs (DVDs) and memory cards.

The decryption module 105 decrypts the received content. The content information extraction module 106 extracts content information from the content decrypted by the decryption module 105. The content information management module 107 manages content information extracted by the content information extraction module 106.

The content information is used to determine whether it is possible to make an output, how to encrypt, and the like, when the content is played back by the display 109, transmitted outside via the digital I/F 103, output to a removable medium by the removable media drive 103, and output to the HDD 113.

The content information is information including Copy Control Information (CCI), output control information, viewable time, viewing situation, the number of times copying has been made, and the like. Such information is authority information of the content. Accordingly, the content information management module 107 manages the information included in the content information after performing encryption, for example, such that the user cannot alter it. Here, the viewable time preset with respect to the content received by the digital tuner 102 of the transmitting device 1 will be referred to as the first viewable time.

The content information further includes metadata of the content, such as the title of content, the date and time of recording, and the playback time (the period of time usually needed to play back all of the contents). The content information management module 107 manages metadata as well. The metadata included in the content information does not need to be encrypted so as to prevent alteration by the user. In the embodiment, the content information management module 107 manages the content information without discriminating between information that needs to be encrypted and information that does not need to be encrypted, but they may be managed by different contents information management modules.

The content information is extracted by the content information extraction module 106 from the content decrypted by the decryption module 105, but may be acquired separately from the content. The content information extraction module 105 may acquire content information in a session different from the acquisition of the content via the LAN 3 from a network, for example.

When the user selects playback of a content in the transmitting device 1, the decoder 108 decodes the content decrypted by the decryption module 105 by the Motion Picture Experts Group (MPEG), for example. The controller 101 controls display of the decoded content on the display 109, according to the content information managed by the content information management module 107.

The encryption module 110 encrypts the content according to the content information managed by the content information management module 107 in transferring the content to the receiving device 2 via the digital I/F 103, outputting the content to a removable media using the removable media drive 103, and outputting the content to the HDD 113. The HDD 113 stores the encrypted contents.

The encryption module 110 encrypts the content using DTCP-IP in transmitting the content to the receiving device 2 via the digital I/F 103. The encryption module 110 encrypts the content using a content key generated using the first viewable time, as well as fixed information (shared secret information) shared between the transmitting device 1 and the receiving device 2, information (time change information) that varies with time, and copy control information (encryption mode) of the content as parameters.

The transmission controller 111 generates and interprets control information used in transmitting the content to the receiving device 2 via the digital I/F 103. The content information generator 112 transmits the content to the receiving device 2 via the digital I/F 103, outputs the content using the removable media drive 103, and generates content information to be output being associated with the content in outputting the content to the HDD 113, according to each of the outputs. The input module 114 is used to input various settings in the transmitting device 1.

Figure 3:
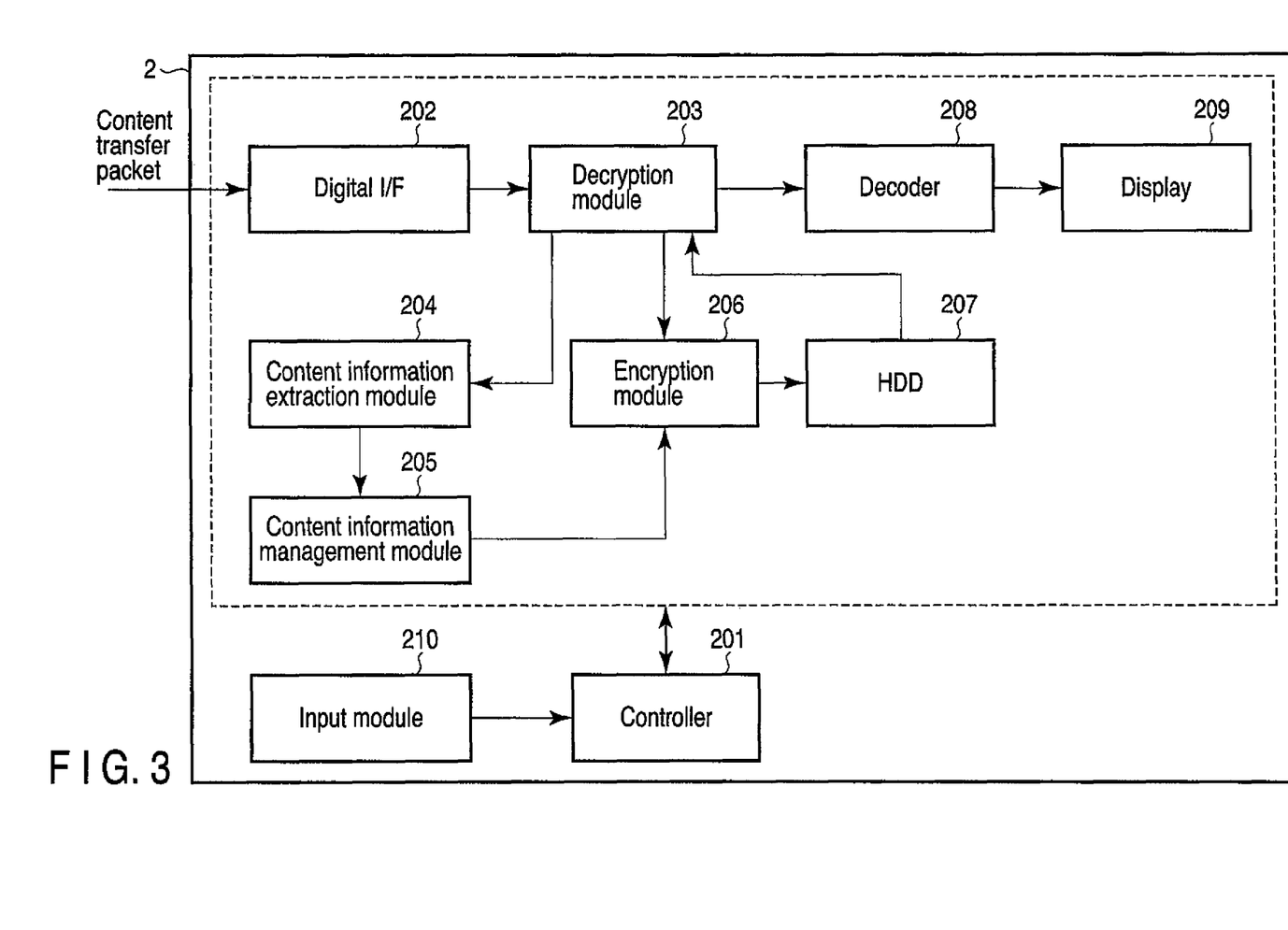
FIG. 3 is an exemplary block diagram schematically illustrating a receiving device according to the embodiment.

Next, the configuration of the receiving device 2 according to the embodiment will be described. FIG. 3 is a block diagram schematically illustrating the receiving device 2. The receiving device 2 is a portable player, for example. The receiving device 2 includes a controller 201, a digital I/F 202, a decryption module 203, a content information extraction module 204, a content information management module 205, an encryption module 206, an HDD 207, a decoder 208, a display 209, and an input module 210.

The controller 201 controls each of the modules of the receiving device 2. The digital I/F 202 receives the encrypted content transferred from the transmitting device 1. The decryption module 203 decrypts the content. The content information extraction module 204 extracts content information from the content. The content information management module 205 manages the content information extracted by the content information extraction module 204.

The encryption module 206 encrypts the content according to the content information managed by the content information management module 205, in outputting the content to the HDD 207. The HDD 207 stores the encrypted content.

When the content is played back in the receiving device 2, the decoder 208 decodes the content decrypted by the decryption module 203 using the MPEG, for example. The controller 201 controls display of the decoded content on the display 209, according to the content information managed by the content information management module 205. The input module 210 is used to input various settings in the receiving device 2.

Figure 4:
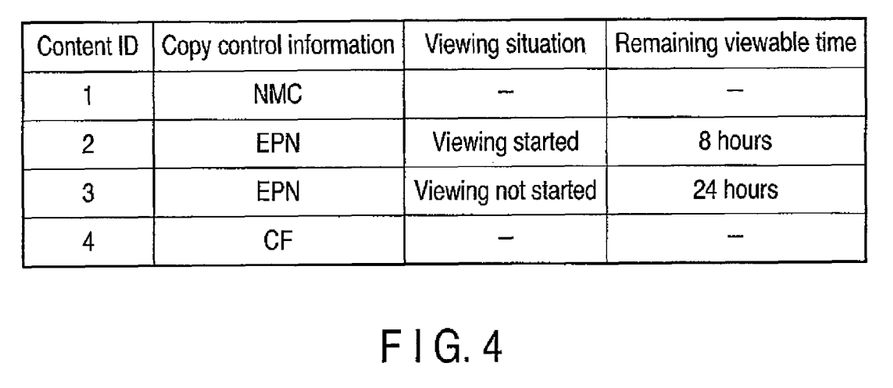
FIG. 4 is an exemplary content management table managed by a transmitting device according to the embodiment.

FIG. 4 illustrates an example of a content management table managed by the content information management module 107 of the transmitting device 1. The content information management module 107 associates the content information with a content identification (ID), which is assigned to each content stored in the HDD 13 of the transmitting device 1, and manages them in the content management table. The content information management module 107 functions as a management module that manages the content and the content information by associating them. FIG. 4 shows the copy control information, the viewing situation, and the remaining viewable time of the content information, which are needed in the embodiment.

It is to be noted that the copy control information refers to information relating to copy restriction of contents defined by Copy Free (CF), Copy One Generation (COG), No More Copy (NMC), Copy Never (CN), Encryption Plus Non-assertion (EPN; which can be copied but protection is required for transfer path information).

The viewing situation refers to information indicating whether the content has already started to be viewed ("viewing started") or the content has never been viewed ("viewing not started").

The remaining viewable time refers to information indicating the remaining amount of time during which contents can be viewed. The content management module 107 manages the remaining viewable time by maintaining it as the first viewable time when the viewing situation of the content in which the viewable time is restricted has not yet started to be viewed. On the other hand, the content management module 107 manages the remaining viewable time as the period of time obtained by subtracting the time elapsed after the viewing has been started from the first viewable time when the viewing situation of the content in which the viewable time is restricted has already started to be viewed. The content management module 107 updates the remaining viewable time as appropriate.

ID1 is associated with a content in which the copy control information is NMC, and the viewable time is not restricted. ID2 is associated with a content in which the copy control information is EPN, the viewing situation is "viewing started", and the remaining viewable time is 8 hours. ID3 is associated with a content in which the copy control information is EPN, the viewing situation is "viewing not started", and the remaining viewable time is the first viewable time. ID4 is associated with a content in which the copy control information is CF, and the remaining viewable time is not restricted.

Figure 5:
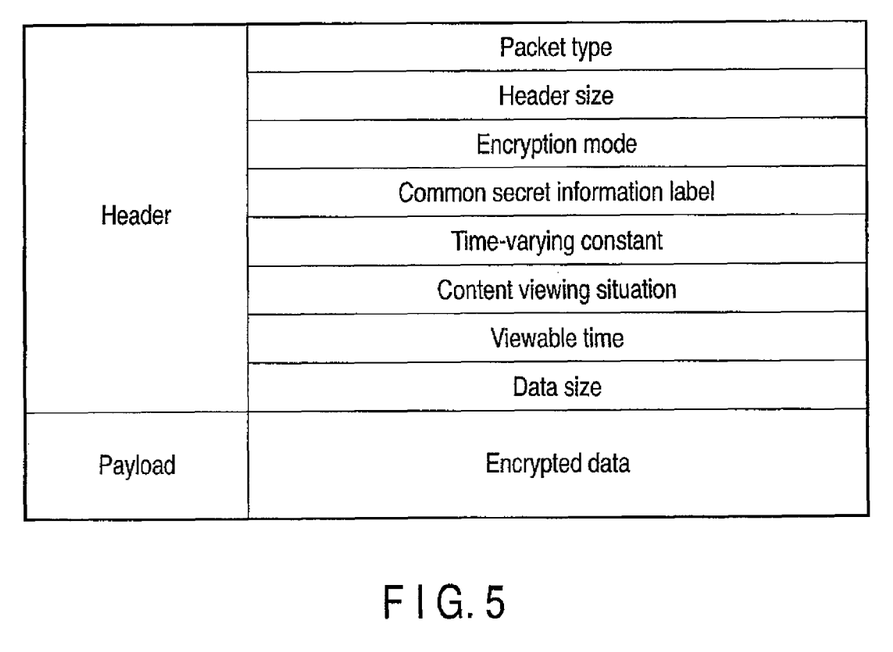
FIG. 5 is an exemplary configuration of a content transfer packet according to the embodiment.

FIG. 5 illustrates an example of a content transfer packet used in transferring a content between the transmitting device 1 and the receiving device 1 via a network. The content transfer packet is formed of a header and a payload. The header includes a packet type, a header size, an encryption mode, a shared secret information label, a time-varying constant, a content viewing situation, a viewable time, and a data size written thereto.

The packet type refers to information indicating the type of content transfer packet. The header size is information indicating the size of information written into the header. The encryption mode refers to information indicating the copy control information. The shared secret information label is shared secret information indicating a key that defines a secret protocol between the transmitting device 1 and the receiving device 2. The time-varying constant is information indicating a constant that varies per time unit. The content viewing situation is information indicating the viewing situation of the content transferred between the transmitting device and the receiving device 2. The viewable time refers to information indicating the time during which the content transferred between the transmitting device 1 and the receiving device 2 can be viewed in the receiving device 2. Hereinafter, the period of time during which the content can be viewed in the receiving device 2 will be referred to as viewable time. The data size is information indicating the size of the overall content transfer packet. An encrypted content is arranged in the payload.

While FIG. 5 shows an example in which the content transfer packet includes a content, the transmitting device 1 may transmit the viewable time to the receiving device 2 by a dedicated packet that does not include a content.

Next, the case where the content transfer packet is transferred between the transmitting device 1 and the receiving device 2 and the content is copied to the receiving device 2 will be described. First, the operation of the transmitting device 1 that transmits a content transfer packet will be described, with reference to the flowchart shown in FIG. 6.

Figure 6:
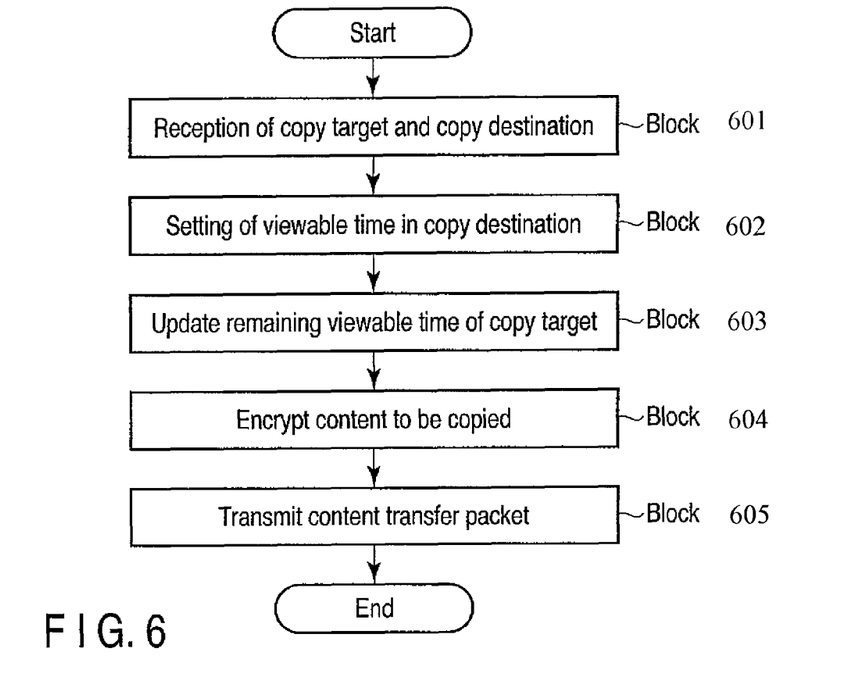
FIG. 6 is an exemplary flowchart illustrating an operation of a receiving device according to the embodiment.

The controller 101 accepts selection of a content to be copied (duplicated) by the user and a device to which the copy (duplicate) is to be made (Block 601). The user selects a content to be copied from the contents stored in the HDD 113 using the input module 114. Here, the case will be described where the content of ID3 shown in FIG. 4 is selected as a content to be copied. Next, the user selects a device to which the copy of the content of the ID3 is to be made. Here, the case will be described where the receiving device 2 is selected using the input module 114 as a device to which the copy is to be made. The input module 114 functions as a selection module to which the copy is made.

Next, the controller 101 sets the second viewable time to the content to be copied (Block 602). It is to be noted that the second viewable time is set in advance according to a standard. Further, the user may set a period of time included in the remaining viewable time of the content of ID3 as the second viewable time. Here, the case will be described where the second viewable time is 4 hours.

Figure 7:
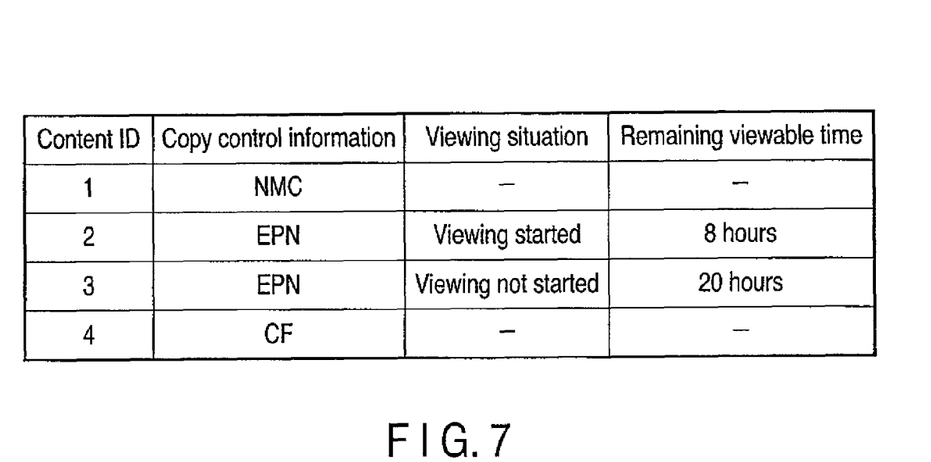
FIG. 7 is an exemplary content management table managed by the transmitting device according to the embodiment.

The controller 101 starts copying the content upon acceptance of selection of a content to be copied, selection of a device to which the copy is to be made, and completion of setting of the second viewable time. The controller 101 updates the remaining viewable time of the content to be copied that is managed by the content information management module 107 to the period of time obtained by subtracting the second viewable time from the first viewable time (Block 603). For example, the controller 101 updates the remaining viewable time of the content of ID3 managed by the content information management module 107 to 4 hours, which is obtained by subtracting the second viewable time, 4 hours, from 24 hours (first viewable time), which is the time before copying is started. The controller 101 functions as an update module. Accordingly, the content information management module 107 manages the remaining viewable time of the content of ID3 by updating it to 20 hours, as shown in the content management table of FIG. 7.

The content information generator 112 sets the viewable time of the header of the content transfer packet shown in FIG. 5 as 4 hours, which is the second viewable time. Further, the content information generator 112 sets the encryption mode as EPN, sets the content viewing situation as "viewing not started", and sets other fields appropriately, according to the content information of ID3 managed by the content information management module 107 shown in FIG. 7.

The encryption module 110 encrypts the content to be copied by DTCP-IP, using a content key generated by using the second viewable time, in addition to the encryption mode, the shared secret information label, and the time change constant as parameters (Block 604). The content information generator 112 arranges the encrypted content in the payload of the content transfer packet shown in FIG. 5. The transfer controller 111 transmits the content transfer packet from the digital I/F 103 of the transmitting device 1 to the digital I/F 202 of the receiving device 2 (Block 605). The transmitting controller 111 and the digital I/F 103 function as transmitters.

Figure 8:
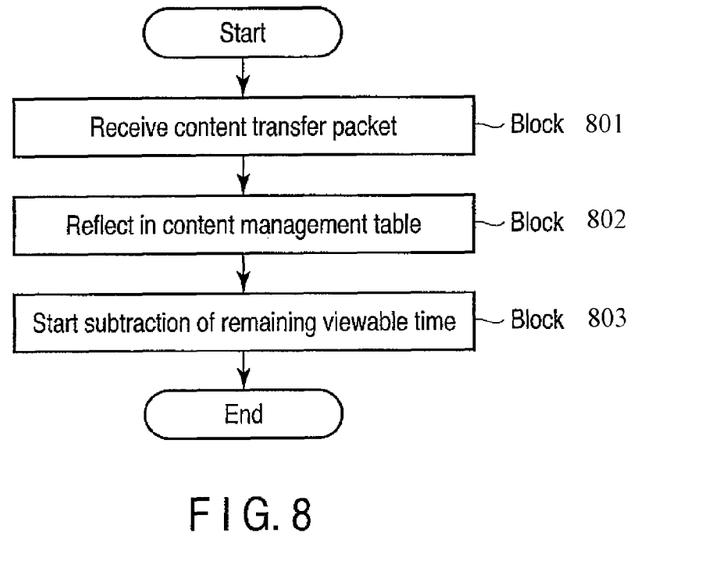
FIG. 8 is an exemplary flowchart illustrating an operation of a transmitting device according to the embodiment.

Next, the operation of the receiving device 2 that has received the content transfer packet will be described, with reference to the flowchart shown in FIG. 8. The controller 201 starts receiving a content transfer packet (Block 801). The controller 201 starts storing the content arranged in the payload in the HDD 207 via the decryption module 203 and the encryption module 206. Further, the controller 201 stores information in which the ID3 and the content information are associated in the content management table of the content information management module 205, based on information included in the header (Block 802).

Figure 9:
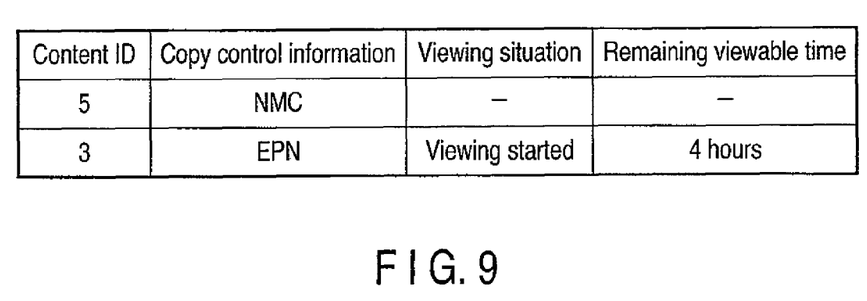
FIG. 9 is an exemplary content management table managed by the receiving device according to the embodiment.

Further, the controller 201 starts subtraction by acquiring the second viewable time included in the header after starting reception of the content transfer packet (Block 803). FIG. 9 shows an example of a content management table managed by the content information management module 205 of the receiving device 2. The content information management module 205 associates content information with an ID assigned to each content stored in the HDD 207 of the transmitting device 2 and manages them in the content management table. FIG. 9 shows the copy control information, the viewing situation, and the remaining viewable time of the content information.

ID5 is associated with a content in which the copy control information is NMC and the viewable time is not restricted. ID3 is associated with a content currently being copied. ID3 is associated with a content in which the copy control information is EPN, the viewing situation is viewing started, and the remaining viewable time is the second viewable time, i.e., 4 hours. The viewing situation of ID3 is set as "viewing started" because the controller 201 starts subtraction of the second viewable time after the controller 201 starts reception of the content transfer packet, as described above.

It is to be noted that the transmitting device 1 may transmit information indicating an instruction to start subtraction of the second viewable time after the receiving device has started reception of the content transfer packet. In that case, the controller 201 starts subtraction of the second viewable time after starting reception of the content viewable time based on that information.

The embodiment should desirably be applied to the case where the contents having copy control information other than NMC and CN mainly copied between devices, from the viewpoint of copyright protection. The embodiment should desirably be applied to the case where the contents in which the viewing situation is "viewing not started". This is because, when a content in which the viewing situation is "viewing started" is copied between devices, subtraction from the first viewable time is already started in the device from which the copy is made.

Further, the transmitting device 1 has been described as starting copying of the content upon completion of selection of the content to be copied, selection of a device to be copied, and setting of the second viewable time, but may be configured so as to judge whether copying should be performed before copying is started. The controller 101 judges that copying of the content is impossible when the remaining viewable time, which is obtained by subtracting the second viewable time from the remaining viewable time of the content to be copied that is managed by the content information management module 107, is less than a certain period of time. The controller 101 functions as a judgment module. The certain period of time may be a predetermined period of time, such as 2 hours, or a playback time of the content to be copied. Thus, since the controller 101 judges whether copying is possible or not, the remaining viewable time of the content in the transmitting device 1 never becomes shorter than the playback time after copying. It is therefore possible to prevent the case where playback of the content is ended halfway even when the user inputs playback of the content in the receiving device 1.

In the above-described embodiment, the transmitting device 1 has been described as setting the second viewable time, but the case will be described where the second viewable time is set by the receiving device 2 as another embodiment. In this case, the second viewable time is determined in advance by a standard in the receiving device 2. Alternatively, the user may set the second viewable time in advance using the input module 210 of the receiving device 2.

The controller 101 of the transmitting device 1 causes the receiving device 2 to acquire the second viewable time at predetermined timing via the digital I/F 103. The controller 101 functions as an acquisition module of the second viewable time. The predetermined timing refers to when the controller 101 has judged that the receiving device 2 has been connected to the transmitting device 1, when the user has selected the receiving device 2 as the destination to which the copy of the content is to be made.

Assume that the second viewable time is set in advance as 6 hours in the receiving device 2. The controller 101 refers to the content information management module 107 and judges whether the remaining viewable time of ID3 is equal to or more than 6 hours. The controller 101 functions as a judgment module.

The controller 101 judges that the content of ID3 cannot be copied when the remaining viewable time of ID3 has been judged as being less than 6 hours. The controller 101 judges that the content of ID3 can be copied when the remaining viewable time of ID3 is equal to or more than 6 hours.

The controller 101 may judge that the content of ID3 cannot be copied when the remaining viewable time obtained by subtracting the second viewable time, i.e., 6 hours, from the remaining viewable time is shorter than a certain period of time, even when the remaining viewable time of ID3 is equal to or more than 6 hours. The certain period of time may be a predetermined period of time, such as 2 hours, or a playback time of the content to be copied.

In this case, the encryption module 110 does not need to use the second viewable time in generating a content key so as to encrypt a content to be copied. The transfer controller 111 does not need to include information on the second viewable time in a header of the content transfer packet. The controller 201 of the receiving device 2 starts subtraction based on the second viewable time preset in the receiving device 2 after starting reception of the content transfer packet.

Next, an advantageous effect of the embodiment will be described. The case will be considered where copying from the playback device 1, which holds a content in which the first viewable time is set, to the receiving device 1 is permitted. In this case, the user may hold the copied content in a portable AV player (receiving device 2), for example, as well as in the main AV device (transmitting device 1) used at home. Accordingly, the user can enjoy the content within the first viewable time even on the road or away from home. A case will be described as an example where an unviewed content A, in which the first viewable time is limited to 24 hours, is copied from an AV device provided at home to a portable AV player by setting the second viewable time as 24 hours.

The AV device starts subtracting 24 hours, the first viewable time, when viewing of the content is started after completion of copying, and the portable AV player starts subtraction from 24 hours, the second viewable time, when viewing of the content A (content A') stored in the portable AV player is started. This will be referred to as the first case.

Even when 24 hours have elapsed after viewing of the content A' is started in the portable AV player and the remaining viewable time becomes zero, the remaining viewable time remains 24 hours, which is the same as the second viewable time, if the content A remains unviewed in the AV player. The first case has a problem that the user of the content is beyond the restriction that the first viewable time originally set in the content A is 24 hours.

The second case designed to avoid the above-described problem will be described. The AV device regards viewing of the content A as having been started after completion of copying, and starts subtraction from 24 hours, the first viewable time. The AV player regards viewing of the content A' as having been started, and starts subtraction from 24 hours, the second viewable time.

This is because even when viewing is started by either the AV device or the AV player after completion of copying, the AV device or the AV player may not be able to exchange information indicating that viewing of either the AV device or the AV player has been started after completion of copying. While copying is being executed, the AV device and the portable AV player are connected via the LAN 3. Accordingly, if the AV device and the portable AV player are connected via the LAN 3, both of the AV device and the portable AV player can inform each other of the information indicating that viewing has been started. After completion of copying, however, one or both of the AV device and the portable player may not be connected to the LAN3 or may be disconnected from a power source.

Assume that the user has started viewing the content A' in the portable AV player immediately after completion of the copying. After 24 hours have elapsed after start of the viewing, the remaining viewable time becomes zero both in the AV player and the portable AV player. Accordingly, the user cannot view the content A (content A') either in the AV device or the portable AV player. Unlike the first case, the second case uses the content in compliant with the restriction of the first viewable time, 24 hours.

However, even when the user does not view the content A (content A') either in the AV device or the portable AV player after completion of copying, to remaining viewable time becomes zero both in the AV device and the portable AV player after elapse of 24 hours after completion of copying. Accordingly, the user cannot view the content A (content A') either in the AV device or the portable AV player. The second case has a problem that efficiency of the user is lost to a sufficient degree.

In the embodiment, when the content A is copied between devices connected via the LAN 3, a certain period of time is defined as the second viewable time in the device to which the copy is made, and the device to which the copy is made starts subtraction of the second viewable time at the same time as the start of copying. The device from which the copy is made sets the period of time obtained by subtracting the second viewable time from the first viewable time as the remaining viewable time.

For example, assume that the second viewable time is 4 hours. When copying of the content A is started, the portable AV player starts subtraction of the second viewable time of the content A'. The user cannot view the content A' in the portable AV player after 4 hours after copying is started. When viewing of the content A is not started in the AV device, the remaining viewable time in the AV device remains 20 hours.

Although the embodiment is different from the definition of the first viewable time, which is 24 hours from when viewing of the content A is started for the first time in either of the devices, the embodiment lies between the first case and the second case and can be a compromise between rental content providers or between the users.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information transmitting apparatus, comprising:
a receiver configured to receive a first content item associated with a first viewable time, the first viewable time defining a period of time during which the content item can be viewed after being started to play back;
a management module configured to manage the first content item and a remaining viewable time by associating the first content item with the remaining viewable time, the remaining viewable time being a remaining period of time during which the first content item can be viewed;
a transmitter configured to transmit a second content item and information of second viewable time to a device to which a duplicate is to be made, the second content item being a duplicate of the first content item and at least part of the second content item being encrypted so as to prevent alteration and the information of the second viewable time defining a period of time during which the second content item can be viewed in the device to which the duplicate is to be made;
a judgment module configured to judge that transmission of the second content item is disapproved when a period of time obtained by subtracting the second viewable time from the remaining viewable time is less than a certain period of time and to judge that the transmission of the second content item is approved when the subtracted period of time is not less than the certain period of time; and
an update module configured to update the remaining viewable time managed by the management module to the subtracted period of time when the transmitter transmits the information of the second viewable time based on the judgment by the judgment module.

2. The apparatus of claim 1, wherein the transmitter is configured to transmit the second content item and the information of the second viewable time to the device to which the duplicate is to be made, when copy control information of the first content item is other than one that prohibits duplicating.

3. The apparatus of claim 1, wherein the transmitter is configured to transmit the information of the second viewable time to the device to which the duplicate is to be made when the first content item is unviewed.

4. The apparatus of claim 1, comprising:
a selection module configured to select the device to which the duplicate is to be made.

5. The apparatus of claim 1, comprising:
an input module configured to input the second viewable time.

6. The apparatus of claim 1, comprising:
an acquisition module configured to acquire the second viewable time set by the device to which the duplicate is to be made; and wherein
the judgment module judges that transmission of the second content item is disapproved when the second viewable time acquired by the acquisition module is longer than the remaining viewable time.

7. A method of transmitting information, comprising:

accepting selection of a device to which a duplicate of a first content item is to be made, a first viewable time that defines a period of time during which the first content item can be viewed after being started to be played back being associated with the first content item;

transmitting a second content item and information of second viewable time to the device to which the duplicate is to be made, the second content item being a duplicate of the first content item and at least part of the second content item being encrypted so as to prevent alteration and the information of the second viewable time defining a period of time during which the second content item can be viewed in the device to which the duplicate is to be made;

judging that transmission of the second content item is disapproved when a period of time obtained by subtracting the second viewable time from the remaining viewable time is less than a certain period of time and judging that the transmission of the second content item is approved when the subtracted period of time is not less than the certain period of time; and managing the first content item by updating the remaining viewable time to the subtracted period of time when transmitting the second content item based on the judgment.

* * * * *